United States Patent [19]

Adam

[11] Patent Number: 4,880,916

[45] Date of Patent: Nov. 14, 1989

[54] CATIONIC AZO DYES CONTAINING 2(P-AMINOPHENYL)OXAZOLO [4,5-B]PYRIDINES AND SIMILAR COMPOUNDS AS DIAZO COMPONENTS

[75] Inventor: Jean-Marie Adam, Rosenau, France

[73] Assignee: Ciba-Geigy Corporation, Ardsley, N.Y.

[21] Appl. No.: 172,684

[22] Filed: Mar. 24, 1988

[30] Foreign Application Priority Data

Mar. 27, 1987 [CH] Switzerland .................. 1170/87

[51] Int. Cl.[4] ................ C09B 44/00; C09B 44/02; C09B 44/06; C09B 44/08
[52] U.S. Cl. .................... 534/606; 534/579; 534/588; 534/589; 534/605; 534/741; 534/752; 534/775; 534/887
[58] Field of Search ............ 534/605, 606, 752, 741, 534/775

[56] References Cited

U.S. PATENT DOCUMENTS

| | | | |
|---|---|---|---|
| 3,167,537 | 1/1965 | Menzel et al. ................ | 534/752 X |
| 3,420,813 | 1/1969 | Mueller et al. ................ | 534/752 |
| 4,081,435 | 3/1978 | Baird et al. ................... | 534/752 |

FOREIGN PATENT DOCUMENTS

| | | | |
|---|---|---|---|
| 0242331 | 10/1987 | European Pat. Off. ............ | 534/752 |
| 2232080 | 1/1974 | Fed. Rep. of Germany ...... | 534/752 |
| 2238400 | 2/1974 | Fed. Rep. of Germany ...... | 534/752 |
| 59-5179267 | 10/1983 | Japan .................................. | 534/752 |
| 1420681 | 1/1976 | United Kingdom ................ | 534/606 |

OTHER PUBLICATIONS

Barni et al., Dyes and Pigments, vol. 6, pp. 1-12 (1985).

*Primary Examiner*—Floyd D. Higel
*Attorney, Agent, or Firm*—Edward McC. Roberts

[57] ABSTRACT

Azo dyes of the formula

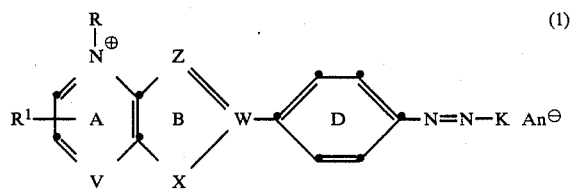

or tautomers thereof, wherein Z is N,S or CH, X is O,S,$NR^2$ or N, V is N or CH, W is N or C, K is a coupling component from the group consisting of acylacetarylamides, phenols, pyridones, quinolines, pyrazoles, indoles, diphenylamines, aminopyridines, pyrimidines, pyrimidones, naphthols, naphthylamines, aminoathiozoles, thiophenes and hydroxypyridines, R is unsubstituted or substituted alkyl or alkenyl, $R^1$ is hydrogen, $C_1$-$C_6$alkyl, $C_1$-$C_4$alkoxy, halogen, nitro, —CN, —$NHR^2$, —NH—acyl, phenoxy, —$COOR^2$, —$COOR^2$—$CONHR^2$ or substituted or unsubstituted phenyl, $R^2$ is hydrogen, substituted or unsubstituted $C_1$-$C_6$alkyl or substituted or unsubstituted phenyl, D is a 1,4-phenylene radical which can be substituted further and $AN^\ominus$ is an anion, and the ring A can also carry a fused, substituted or unsubstituted benzene ring, are used for dyeing and printing textile materials, paper and leather, and for preparing inks.

15 Claims, No Drawings

CATIONIC AZO DYES CONTAINING 2(P-AMINOPHENYL)OXAZOLO [4,5-B]PYRIDINES AND SIMILAR COMPOUNDS AS DIAZO COMPONENTS

The invention relates to novel cationic azo dyes, a process for their preparation and their use as dyes for dyeing or printing textile materials, leather and, in particular, paper.

The invention relates to azo dyes of the formula

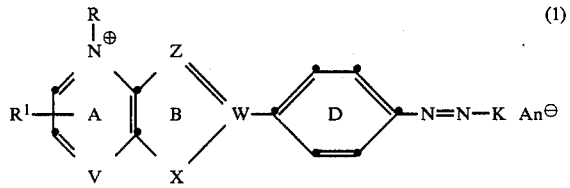

or tautomeric forms thereof, in which: Z is N, S or CH, X is O, S, $NR^2$ or N, V is N or CH, W is N or C, K is a coupling component from the series comprising acylacetarylamides, phenols, pyridones, quinolines, pyrazoles, indoles, diphenylamines, aminopyridines, pyrimidines, pyrimidones, naphthols, naphthylamines, aminothiazoles, thiophenes or hydroxypyridines, R is unsubstituted or substituted alkyl or alkenyl, $R^1$ is hydrogen, $C_1$–$C_6$alkyl, $C_1$–$C_4$alkoxy, halogen, nitro, —CN, —$NHR^2$, —NH—acyl, phenoxy, $COOR^2$, —$CONHR^2$ or substituted or unsubstituted phenyl, $R^2$ being hydrogen, substituted or unsubstituted $C_1$–$C_6$alkyl or substituted or unsubstituted phenyl, D is a 1,4-phenylene radical which can be substituted further and $An^{\ominus}$ is an anion, and the ring A can also carry a fused, substituted or unsubstituted benzene ring.

Coupling components which are particularly preferred are the pyrimidines, acetoacetylarylamides, pyrazoles and pyridines.

The pyrimidines are, in particular, compounds of the formula

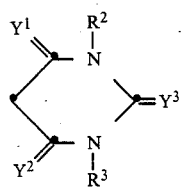

in which $Y^1$ and $Y^2$ independently of one another are =O, =NH or =N—$C_1$–$C_6$alkyl, $Y^3$ is =O, =S, =$NR^2$ or =N—CN and $R^2$ and $R^3$ independently of one another are hydrogen, substituted or unsubstituted $C_1$–$C_6$alkyl or substituted or unsubstituted phenyl.

If $R^2$ and/or $R^3$ are a substituted or unsubstituted $C_1$–$C_6$alkyl group, this is to be understood in general in this application as meaning, for example, a methyl, ethyl, n-propyl, isopropyl, n-, sec-, iso- or tert-butyl radical, a linear or branched pentyl or hexyl radical or a cyclohexyl radical, each of which can be monosubstituted or polysubstituted, for example, by —OH, $C_1$–$C_4$alkoxy or $C_1$–$C_4$hydroxyalkoxy.

The following are examples of suitable substituted $C_1$–$C_6$alkyl radicals: methoxymethyl, ethoxymethyl, ethoxyethyl, ethoxypropyl, n-propoxymethyl, isopropoxymethyl, butoxymethyl, butoxyethyl, butoxypropyl, ethoxypentyl, methoxybutyl, ethoxypentyl and 2-hydroxyethoxypentyl.

If $R^2$ and/or $R^3$ are substituted or unsubstituted phenyl, this can be phenyl which is unsubstituted or monosubstituted or polysubstituted by identical or different radicals. The following are examples of suitable radicals of this type: $C_1$–$C_4$alkyl, which is to be understood as meaning in general in this application as meaning methyl, ethyl, n-propyl, isopropyl or n-, sec- or tert-butyl, $C_1$–$C_4$alkoxy, which in this application in general embraces methoxy, ethoxy, n-propoxy, isopropoxy or n-, sec- or tert-butoxy, halogen, such as fluorine, chlorine or bromine, or nitro.

As phenyl, $R^2$ and/or $R^3$ are preferably a phenyl which is unsubstituted or substituted by 1 to 3 $C_1$–$C_4$alkyl, chlorine or methoxy groups, unsubstituted phenyl being particularly preferred.

$R^2$ and/or $R^3$ are preferably hydrogen or $C_1$–$C_4$alkyl, and particularly preferably are hydrogen.

$Y^1$ and/or $Y^2$ are preferably the functional group =O or =NH, it being also preferable for $Y^1$ and $Y^2$ to be identical. It is particularly preferable for $Y^1$ and $Y^2$ to be identical and for each of them to be =O.

If $Y^3$ is =$NR^2$, the meanings and preferences mentioned above apply to $R^2$.

$Y^3$ is preferably the group =O, =NH or =N—CN, and particularly preferably is the group =OH.

In a particularly preferred embodiment of the azo dyes according to the invention $Y^1$, $Y^2$ and $Y^3$ are each =O.

If the coupling component K is an acetoacetylarylamide, this is, in particular, a compound of the formula $$CH_3-CO-CH_2-CO-NH-Ar \qquad (3)$$

in which Ar is a phenyl, naphthyl or benzthiazol-2-yl radical which can be substituted by $C_1$–$C_4$alkyl, $C_1$–$C_4$alkoxy, chlorine, bromine, nitro or acetylamino. Particularly preferred coupling components are those of the formula (3), in which Ar is a phenyl radical which is a monosubstituted or disubstituted by methyl, methoxy or acetylamino.

If the coupling component K is a pyrazole, this preferably corresponds to the formula

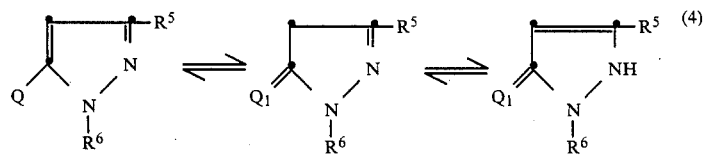

in which Q is OH or $NH_2$, $Q_1$ is O or NH, $R^6$ is H, $C_1$–$C_4$alkyl, alkenyl, cycloalkyl, aryl, in particular phenyl, benzyl or phenylethyl, and $R^5$ is identical with $R^6$ or is $COOR^6$ or $CONHR^6$.

If the coupling component K is a pyridone, this preferably has the formula

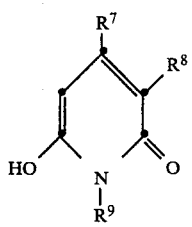
(5)

in which $R^7$ is hydrogen or $C_1$-$C_4$alkyl, $R^8$ is CN, CONH$_2$ or SO$_2$NH$_2$ and $R^9$ is hydrogen or $C_1$-$C_8$alkyl.

The coupling component K can also be a dialkylaniline. If K is an N,N-dialkylaniline in which alkyl is, for example, methyl, ethyl or cyanoethyl, the dialkylaniline must carry an acylamino group, for example a $C_1$-$C_4$alkanoylamino or benzoylamino group, preferably an acetylamino group, if the rings A and B in the dyes of the formula (1) are a pyridineoxazole system and if $R^1$ is hydrogen.

In the dyes of the formula (1) $R^1$ is hydrogen, $C_1$-$C_6$alkyl, $C_1$-$C_4$alkoxy, halogen, nitro, CN, —NHR$^2$, —NH—acyl, phenoxy, —CONHR$^2$ or substituted or unsubstituted phenyl, and 1 to 3 of these radicals, which can be identical or different, are present.

If $R^1$ is a radical —NHR$^2$ or —CONHR$^2$, the meanings and preferences indicated above apply to R$^2$.

If $R^1$ is —NH—acyl, the acyl radical can, as in general in this application, be a $C_2$-$C_6$alkanoyl or benzoyl radical, for example. Examples of suitable $C_2$-$C_6$alkanoyl radicals are acetyl, propionyl, butyryl, isobutyryl, valeryl, isovaleryl or pivaloyl.

The benzoyl can, if appropriate, be further substituted in the manner described above for phenyl.

As —NH—acyl, $R^1$ is preferably —NH—$C_1$-$C_6$alkanoyl or —NH—benzoyl, each of which is unsubstituted or substituted by 1 to 3 $C_1$-$C_4$alkyl, chlorine or methoxy groups.

If $R^1$ is phenoxy, this can be unsubstituted or can be further substituted in the manner described above for phenyl; the phenoxy in this case is preferably not further substituted.

$R^1$ is preferably hydrogen, $C_1$-$C_4$alkoxy, acylamino or $C_1$-$C_6$alkyl.

$R^1$ is particularly preferably hydrogen, $C_1$-$C_4$alkoxy or $C_1$-$C_4$alkyl.

In a particularly preferred embodiment of the azo dyes according to the invention, $R^1$ is methyl or, in particular, hydrogen.

If X is —NR$^2$—, the meanings and preferences previously described apply to R$^2$.

X is preferably N and particularly preferably O.
Z is preferably N.
W is preferably C or, if Z and X are N, it is N.
V is preferably CH.

The ring A can also carry a fused benzene ring. This ring is preferably fused via the C atoms 2 and 3 of the pyridinium ring. If V is C, it can, however, also be fused via the C atoms 3 and 4. The fused benzene ring can also carry substituents, for example the substituents $R^1$.

Particularly preferred compounds of the formula (1) are, however, those in which the rings A and B are a pyridineoxazole system.

The 1,4-phenylene radical D can, if appropriate, be monosubstituted or polysubstituted by the customary substituents, such as $C_1$-$C_4$alkyl, $C_1$-$C_4$alkoxy, halogen, such as fluorine, chlorine or bromine, nitro or —CN. D is preferably a 1,4-phenylene radical which is unsubstituted or substituted by chlorine or methyl; it is particularly preferable for D to be a 1,4-phenylene radical which is not further substituted.

If R is unsubstituted or substituted alkyl, it is, in particular, the alkyl groups mentioned for R$^2$. Alkenyl groups suitable for R are the corresponding groupings containing at least one double bond.

R is preferably a $C_1$-$C_4$alkyl group which is unsubstituted or is substituted by OH, $C_1$-$C_4$alkoxy, phenyl or $C_1$-$C_4$hydroxyalkoxy.

Suitable anions An$^\ominus$ are the organic and inorganic, preferably colourless, anions which are customary for the cationic dyes. In general, the anion is introduced by means of the process of preparation (for example by means of quaternization) or by the purification of the crude compound which may be carried out. Anions can, however, also be replaced by one another in a specific manner by customary processes.

The following are examples of possible anions An$^\ominus$; halide, fluoroborate, thiocyanate, sulfate, alkylsulfate, aminosulfate, chlorate, perchlorate, carbonate, bicarbonate, phosphate, phosphomolybdate, phosphotungstate, phosphotungstomolybdate, benzenesulfonate, chlorobenzenesulfonate, naphthalenesulfonate, toluenesulfonate, oxalate, maleate, formate, acetate, propionate, lactate, succinate, chloroacetate, tartrate, methanesulfonate and benzoate ions, and also complex anions, particularly those of zinc chloride double salts, for example the tetrachlorozincate ion.

An$^\ominus$ is advantageously a halide, methylsulfate, ethylsufate, phosphate, sulfate, carbonate, benzenesulfonate, toluenesulfonate, 4-chlorobenzenesulfonate, acetate, formate or tetrachlorozincate ion; the compounds according to the invention are present, in particular, as halides (especially chlorides), methosulfates, ethosulfates, sulfates, benzenesulfonates or toluenesulfonates or as zinc chloride double salts (for example tetrachlorozincates).

Compounds of the formula (1) which are particularly preferred are those in which K is a coupling component of the formula (2), (3), (4) or (5), R$_1$ is hydrogen, $C_1$-$C_4$alkoxy, $C_1$-$C_6$alkyl or acylamino, R is $C_1$-$C_4$alkyl which is unsubstituted or is substituted by OH, $C_1$-$C_4$alkoxy or $C_1$-$C_4$hydroxyalkoxy, and V is CH, and the remaining symbols are as defined under the formula (1).

Compounds of particular industrial importance are those of the formula

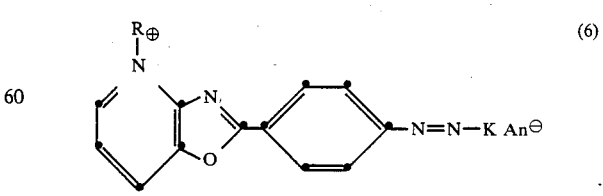
(6)

in which R is $C_1$-$C_4$alkyl which is unsubstituted or is substituted by OH, $C_1$-$C_4$alkoxy or $C_1$-$C_4$hydroxyalkoxy, K is a coupling component of the formula

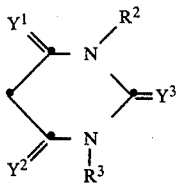

(2)

in which $R^2$ and $R^3$ are hydrogen or $C_1$–$C_4$alkyl, $Y^1$ and $Y^2$ are =O or =NH, and $Y^3$ is =O, =NH or =N—CN, or a coupling component of the formula $$CH_3—CO—CH_2—CO—NH—Ar \quad (3)$$

in which Ar is a phenyl radical which is monosubstituted or disubstituted by methyl, methoxy or acetylamino, and $An^\ominus$ is an anion.

The novel cationic azo dyes of the formula (1) can be prepared by processes which are known per se. They are obtained, for example, by diazotizing a compound of the formula

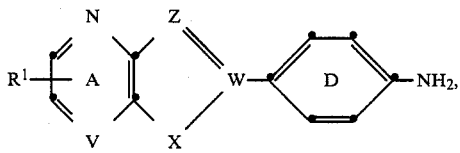

(7)

coupling the product with a coupling component HK and quaternizing the coupling product with a compound of the formula $$R—An \quad (8),$$

$R^1$, V, Z, X, W, A, D and R being as defined in formula (1) and An being a radical which can be converted into the anion $An^-$ in the course of the quaternization.

The compounds of the formula (7) are known or can be prepared by methods which are known per se. 2-(p-Aminophenyl)oxazolo(4,5-b)pyridine can, for example, be obtained by the method described in Dyes and Pigments 6, 1–12 (1985).

The coupling component HK and the compounds of the formula (8) are also known.

The diazotization of the compounds of the formula (7) is carried out in a manner known per se, for example by means of sodium nitrite in an acid, aqueous medium, for example hydrochloric acid or sulfuric acid. The diazotization can, however, also be carried out using other diazotizing agents, for example using nitrosylsulfuric acid. In this case an additional acid can be present in the reaction medium, for example phosphoric acid, sulfuric acid, acetic acid, hydrochloric acid or mixtures of these acids, for example mixtures of phosphoric acid and acetic acid. It is advantageous to carry out the diazotization at temperatures from −10° to 30° C., for example from −10° C. to room temperature.

The coupling of the diazotized compound of the formula (7) with the coupling component HK is also carried out in a known manner, for example in an acid, aqueous or aqueous-organic medium, advantageously at temperatures from −10° to 30° C., especially below 10° C. The acids used are, for example, hydrochloric acid, acetic acid, sulfuric acid or phosphoric acid. The diazotization and coupling can, for example, be carried out in a one-pot process, i.e. in the same reaction medium.

The quaternization is advantageously carried out in an inert organic solvent, for example in a hydrocarbon, chlorinated hydrocarbon or nitrohydrocarbon, such as benzene, toluene, xylene, tetrachloroethane, chloroform, carbon tetrachloride, monochlorobenzene, dichlorobenzene or nitrobenzene, in an acid amide or acid anhydride, such as dimethylformamide, N-methylacetamide or acetic anhydride, in dimethyl sulfoxide or in a ketone, such as acetone or methyl ethyl ketone. It is also possible to use an excess of the alkylating agent instead of an organic solvent. The reaction can, however, also be carried out in an aqueous medium, for example in an aqueous suspension, or, for instance, in glacial acetic acid. The quaternization is advantageously carried out at elevated temperatures, for example 30°–200° C., in particular 80°–150° C., if appropriate with the addition of acid-binding agents, such as an inorganic base, for example magnesium oxide, magnesium carbonate, sodium carbonate, calcium carbonate or sodium bicarbonate, and, if appropriate, under pressure. The most advantageous conditions in a particular case can readily be determined by means of a preliminary test.

The quaternizing agents employed for the quaternization are known agents R—An introduce the radical R and in which the radical An is converted into the anion $An^\ominus$. The following are some examples of quaternizing agents R—An: alkyl halides, halogenoacetamides, β-halogenopropionitriles, halogenohydrins, alkylene oxides, alkyl esters of sulfuric acid or alkyl esters of organic sulfonic acids, for example methyl chloride, bromide or iodide, ethyl chloride, bromide or iodide, propyl bromide or iodide, butyl bromide, benzyl chloride or bromide, chloroacetamide, β-chloropropionitrile, ethylene chlorohydrin, dimethyl sulfate, diethyl sulfate, dibutyl sulfate, methyl benzenesulfonate, methyl, ethyl, propyl or butyl p-toluenesulfonate, n-propyl, isopropyl, n-butyl, sec-butyl and tert-butyl benzenesulfonate, allyl chloride or bromide, methallyl chloride or bromide, trimethyloxonium fluoroborate, 1,4-dichloroprop-2-ene, 1-chlorobut-2-ene, 1,2-dichloroprop-2-ene, 1-chloro-2-vinylprop-2-ene, 1-chloro-2,4-pentadiene and acrylonitrile, acrylic acid, acrylamide, methyl acrylate, ethylene oxide and propylene oxide.

The radical An is therefore preferably halogen (for example Cl, Br or I), alkyl-$SO_4$, lactate, formate or acetate.

After the quaternization, the novel compounds of the formula (1) can be separated from the reaction medium and dried or used without further treatment as a solution. If desired or necessary (for example for reasons of solubility), the anion $An^\ominus$ in the resulting compounds of the formula (1) can be replaced in a manner known per se by another anion.

The azo compounds of the formula (1) are employed either as powder or granule preparations or in the form of concentrated solutions. Powder preparations are formulated in a customary manner using a standardizing materials such as sodium sulfate, phosphate, chloride or acetate, in the presence of anti-dust agents, or the azo compounds are put on the market without further treatment as spray dried preparations. Concentrated dye solutions can be aqueous or aqueous/organic, preferred additives being those which are customary and as readily degradable as possible, such as organic acids, preferably acetic acid, formic acid, lactic acid or citric acid, amides, such as formamide, dimethylformamide or urea, or alcohols, such as glycol, diglycol or diglycol ethers, preferably the methyl or ethyl ether.

The azo compounds of the formula (1) are used, in particular, as dyes for dyeing and printing textile materials, paper and leather and for the preparation of inks. Suitable textile materials are natural and synthetic materials which can be dyed by cationic processes. The novel azo compounds are preferably employed for dyeing and printing paper, thin cardboard and cardboard in the pulp and on the surface, and also textile materials which, for example, advantageously consist of homopolymers or copolymers of acrylonitrile or of synthetic polyamides or polyesters modified with acid groups. These textile materials are preferably dyed in an aqueous, neutral or acid medium by the exhaust method, if appropriate under pressure, or by the continuous method. In this regard, the textile material can be in a very wide variety of different forms, for example as fibres, filaments, woven fabrics, knitted fabrics, piece goods and made-up articles, such as shirts or pullovers.

The dyes according to the invention make it possible to produce level dyeings or prints which are distinguished by very good overall fastness properties, in particular a very high degree of exhaustion and good fastness properties to water.

Furthermore, the novel azo compounds of the formula (1) can also be used for dyeing and printing natural and regenerated cellulose materials, in particular cotton and viscose, deeply coloured dyeings also being obtained.

On these textile materials, the novel azo compounds of the formula (1) have a good substantially a good degree of exhaustion, and the dyeings obtained exhibit very good fastness properties, in particular fastness to wet processing.

A preferred use of the novel azo compounds of the formula (1) is their use for dyeing paper of all kinds, in particular bleached, unsized and sized, lignin-free paper, it being possible to use bleached or unbleached pulp as the starting material and to use hardwood pulp or softwood pulp, such as birch and/or pine sulfite and/or sulfate pulp. These compounds are very particularly suitable for dyeing unsized paper (for example table napkins, table cloths and hygiene papers) as a result of their very high affinity for this substrate.

The novel azo compounds of the formula (1) are very strongly absorbed onto these substrates, the effluents remaining virtually colourless. Dyeings in yellow, green-yellow or orange shades are obtained.

The dyeings obtained are distinguished by good overall fastness properties, such as good fastness to light, and at the same time have a high clarity and depth of colour and fastness to wet processing, i.e. they exhibit no tendency to bleeding when dyed paper is brought into contact under wet conditions with moist white paper.

In addition they exhibit good fastness to alum, acids and alkalis. The fastness to wet processing relates not only to water, but also to milk, fruit juices and sweetened mineral water; owing to their good fastness to alcohol, the dyes are also fast to alcoholic beverages. This property is particularly desirable, for example, for table napkins and table cloths in the case of which it can be expected that the dyed paper will come into contact in a wet state (for example impregnated with water, alcohol, surfactant solution etc.) with outer surfaces, such as textiles, paper and the like, which must be protected against soiling.

The high affinity for paper and the high exhaustion rate of the novel dyestuffs is of great advantage for the continuous dyeing of paper.

The following examples illustrate the invention without limiting it thereto. Unless otherwise stated, parts are parts by weight and the temperatures are quoted in degrees centigrade.

The abbreviation RKN is a designation of grade and indicates the purity of the cellulose; the abbreviation SR (Schopper-Riegler) indicates the freeness.

EXAMPLE 1

(a) 14 parts of p-aminobenzoic acid and 11 parts of 2-amino-3-hydroxypyridine are stirred for 1 hour in 100 parts of polyphosphoric acid at 200° C. The reaction mixture is cooled to 150° C. and is then poured on to ice. The precipitated reaction product of the formula

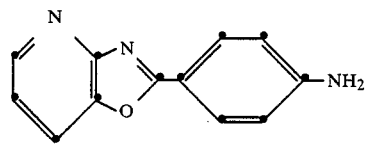

is filtered off with suction, washed with water until neutral and dried.

(b) 6.4 parts of this intermediate in 200 parts of water are diazotized in a customary manner with 8 parts of 30% hydrochloric acid and 8 parts of 4N sodium nitrite. The diazo solution is added dropwise at 0°–5° to a mixture of 6.2 parts of acetoacet-o-anisidide, 4 parts of 30% sodium hydroxide solution and 150 parts of water. The pH of the reaction mixture is then adjusted to 9 with 15 parts of 2N sodium hydroxide solution, whereupon the dye of the formula

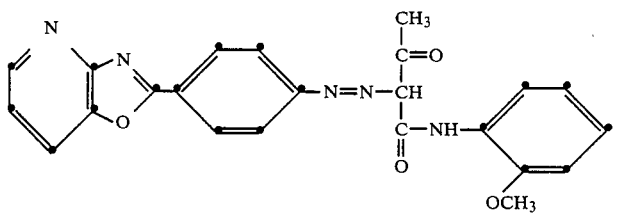

is precipitated. The product is filtered off with suction, washed with water till neutral and dried.

(c) 4.3 parts of the dye obtained under (b) in 50 parts of dimethylformamide are stirred with 2 parts of dimethyl sulfate for 3 hours at 110°. The dye of the formula

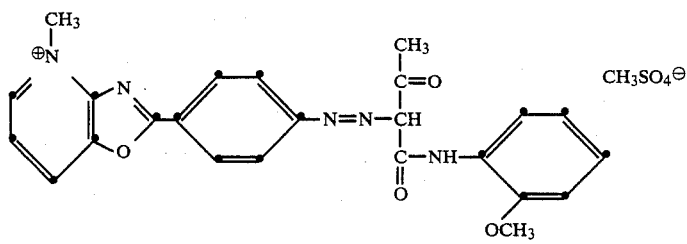

is isolated by filtration and dried. It dyes paper in brilliant greenish-tinged yellow shades and exhibits very good fastness to light and excellent build-up.

EXAMPLES 2–19

The procedure indicated in Example 1 is repeated, but using the diazo components listed in column 2 of the following table and the coupling components mentioned in column 3. Azo dyes which dye the paper in the shades indicated in column 5 are obtained after quaternization with the quaternizing agents listed in column 4.

| Ex. | Diazo component | Coupling component | Quaternizing agent | Shade on paper |
|---|---|---|---|---|
| 2 | [benzoxazole-phenyl-NH₂] | CH₃—CO—CH₂—CO—NH—(2-methoxyphenyl) | diethyl sulfate | green-yellow |
| 3 | [benzothiazole-phenyl-NH₂] | CH₃—CO—CH₂—CO—NH—(2-methoxyphenyl) | dimethyl sulfate | green-yellow |
| 4 | [methylbenzofuran-phenyl-NH₂] | CH₃—CO—CH₂—CO—NH—(2-methoxyphenyl) | dimethyl sulfate | yellow |
| 5 | [methylbenzotriazole-N-phenyl-NH₂] | CH₃—CO—CH₂—CO—NH—(2-methoxyphenyl) | dimethyl sulfate | green-yellow |
| 6 | [methylbenzimidazole-phenyl-NH₂] | CH₃—CO—CH₂—CO—NH—(2-methoxyphenyl) | dimethyl sulfate | green-yellow |

-continued

| Ex. | Diazo component | Coupling component | Quaternizing agent | Shade on paper |
|---|---|---|---|---|
| 7 | benzothiazole-phenyl-NH₂ (4-methylthiazole linked benzo-fused, with phenyl-NH₂) | CH₃—CO—CH₂—CO—NH—(2-methoxyphenyl) | dimethyl sulfate | green-yellow |
| 8 | benzoxazole (4-methyl) linked to phenyl-NH₂ | CH₃—CO—CH₂—CO—NH—(4-methoxyphenyl) | diethyl sulfate | green-yellow |
| 9 | benzoxazole (4-methyl) linked to phenyl-NH₂ | CH₃—CO—CH₂—CO—NH—(4-methoxyphenyl) | dimethyl sulfate | green-yellow |
| 10 | benzoxazole (4-methyl) linked to phenyl-NH₂ | phenyl with N(C₂H₅)₂ and NHCOCH₃ substituents | dimethyl sulfate | orange |
| 11 | benzoxazole (4-methyl) linked to phenyl-NH₂ | 1-H-pyridone with CH₃, CN, OH substituents | dimethyl sulfate | yellow |
| 12 | benzoxazole (4-methyl) linked to phenyl-NH₂ | CH₃—CO—CH₂—CO—NH—(2,4-dimethoxyphenyl) | dimethyl sulfate | yellow |
| 13 | benzoxazole (4-methyl) linked to phenyl-NH₂ | pyrimidine with NH₂, NH₂, NH₂ substituents | dimethyl sulfate | yellow |

-continued

| Ex. | Diazo component | Coupling component | Quaternizing agent | Shade on paper |
|---|---|---|---|---|
| 14 | 4-methyl-benzoxazol-2-yl-phenyl-NH₂ | CH₃—CO—CH₂—CO—NH—(C₆H₄)—NH—CO—CH₃ | dimethyl sulfate | green-yellow |
| 15 | 4-methyl-benzoxazol-2-yl-phenyl-NH₂ | dihydroxy-pyrimidinyl-NH₂ (HO, N, N, HO) | dimethyl sulfate | yellow |
| 16 | 4-methyl-benzoxazol-2-yl-phenyl-NH₂ | CH₃—CO—CH₂—CO—NH—(2-OCH₃, 5-CH₃-phenyl) | dimethyl sulfate | green-yellow |
| 17 | 4-methyl-benzoxazol-2-yl-phenyl-NH₂ | HO, CH₃-pyrazol-NH | dimethyl sulfate | yellow |
| 18 | 4-methyl-benzoxazol-2-yl-phenyl-NH₂ | CH₃—CO—CH₂—CO—NH—(methyl-benzothiazolyl) | dimethyl sulfate | green-yellow |
| 19 | 4-methyl-benzoxazol-2-yl-phenyl-NH₂ | HO, pyrimidinone-N=N—CN | dimethyl sulfate | yellow |

EXAMPLE 20

50 parts of chemically bleached beech sulfite are mixed with 50 parts of bleached RKN 15 (freeness 22° SR) and 2 parts of the dye according to Example 1 in water (pH 6, hardness of water 10° of German hardness, temperature 20° and liquor ratio 40:1). After stirring for 15 minutes, paper sheets are produced on a Frank sheet-former.

The paper has been dyed in a very intense greenish-tinged yellow shade. The effluent is completely colourless. A degree of exhaustion of virtually 100% is attained. The fastness properties to light and wet processing are excellent.

EXAMPLE 21

A paper web composed of bleached beech sulfite pulp (22° SR) is produced on a continuously operating laboratory paper-making machine. An aqueous solution of the dye according to Example 1 is metered continuously into the low-density pulp 10 seconds upstream of the head box, with vigorous turbulence (0.5% dyeing, liquor ratio 400:1, hardness of water 10° German hardness, pH 6, temperature 20°).

A deep green-yellow coloration of medium intensity is formed on the paper web. The effluent is completely colourless.

EXAMPLE 22

10 parts of cotton fabric (bleached, mercerized cotton) are dyed in a laboratory beam dyeing machine in 200 parts of a liquor (hardness of water 10° German hardness, pH 4, dye liquor circulated three times per minute) containing 0.05 part of the dye according to Example 1. The temperature is raised in the course of 60 minutes from 20° to 100° and is then kept constant for 15 minutes.

The dye liquor is completely exhausted. A deep green-yellow coloration distinguished by good fastness to light and very good fastness to wet processing is formed on the cotton fabric.

A textile fabric composed of regenerated (viscose) is dyed by the same procedure. A deep green-yellow dyeing which has good fastness to light and very good fastness to wet processing is also obtained on this material by means of the dye of Example 1.

What is claimed is:

1. An azo dye of the formula

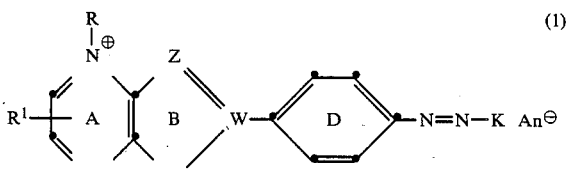

or tautomeric forms thereof, in which: Z is N, S or CH, X is O, S, $NR^2$ or N, V is N or CH, W is N or C, K is a coupling component selected from the group consisting of acylacetarylamides, phenols, pyridones, quinolines, pyrazoles, indoles, diphenylamines, aminopyridines, pyrimidines, pyrimidones, naphthols, naphthylamines, aminothioazoles, thiophenes and hydroxypyridines, R is $C_1$-$C_6$alkyl or $C_2$-$C_6$alkenyl, these groups being unsubstituted or substituted by OH, $C_1$-$C_4$alkoxy or $C_1$-$C_4$hydroxyalkoxy, $R^1$ is hydrogen, $C_1$-$C_6$alkyl, $C_1$-$C_4$alkoxy, halogen, nitro, —CN, $NHR^2$, —MH—C-$_2$-$C_6$alkanoyl or —NH—benzoyl, each of which is unsubstituted or substituted by 1 to 3 $C_1$-$C_4$alkyl, chlorine or methoxy groups, phenoxy or phenoxy substituted by $C_1$-$C_4$alkyl, $C_1$-$C_4$alkoxy, halogen or nitro, —$COOR^2$, —$CONHR^2$ or unsubstituted phenyl or phenyl substituted by $C_1$-$C_4$alkyl, $C_1$-$C_4$alkoxy, halogen or nitro, $R^2$ being hydrogen, unsubstituted $C_1$-$C_6$alkyl or $C_1$-$C_6$alkyl substituted by OH, $C_1$-$C_4$alkoxy or $C_1$-$C_4$hydroxyalkoxy, unsubstituted phenyl, or phenyl substituted by $C_1$-$C_4$alkyl, $C_1$-$C_4$alkoxy, halogen or nitro, D is a 1,4-phenylene radical which is unsubstituted or substituted by $C_1$-$C_4$alkyl, $C_1$-$C_4$alkoxy, halogen, nitro or cyano, $An^\ominus$ is an anion and the ring A being not further substituted or this ring carrying a fused benzene ring which is unsubstituted or substituted by $R^1$.

2. An azo dye according to claim 1, wherein K is a coupling component selected from the group consisting of the pyrimidines, acetoacetylarylamides, pyrazoles or pyridones.

3. An azo dye according to claim 2, wherein K is a compound of the formula

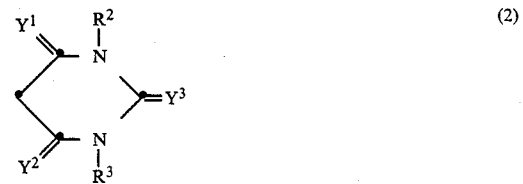

in which $Y^1$ and $Y^2$ independently of one another are =O, =NH or =N—$C_1$-$C_6$alkyl, $Y^3$ is =O, =S, =$NR^2$ or =N—CN and $R^2$ and $R^3$ independently of one another are hydrogen, unsubstituted $C_1$-$C_6$-alkyl or $C_1$-$C_6$alkyl substituted by OH, $C_1$-$C_4$alkoxy or $C_1$-$C_4$-hydroxyalkoxy, unsubstituted phenyl or phenyl substituted by $C_1$-$C_4$alkyl, $C_1$-$C_4$alkoxy, halogen or nitro or a compound of the formula $$CH_3—CO—CH_2—CO—NH—Ar \qquad (3)$$

in which

Ar is a phenyl, naphthyl or benzthiazol-2-yl radical each of which is unsubstituted or substituted by $C_1$-$C_4$alkyl, $C_1$-$C_4$alkoxy, chlorine, bromine, nitro or acetylamino, or a compound of the formula

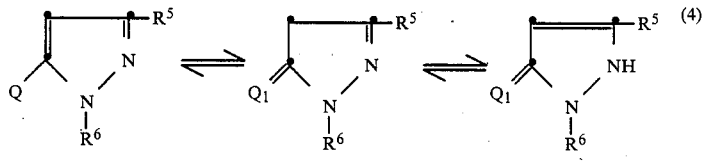

in which

Q is OH or $NH_2$, $Q_1$ is O or NH, $R^6$ is H, $C_1$-$C_4$alkyl, alkenyl, cycloalkyl, phenyl, benzyl or phenylethyl, and $R^5$ is identical to $R^6$ or is $COOR^6$ or $CONHR^6$, or a compound of the formula

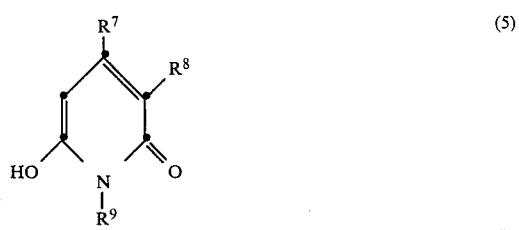

in which $R^7$ is hydrogen or $C_1$-$C_4$alkyl, $R^8$ is CN, $CONH_2$ or $SO_2NH_2$ and $R^9$ is hydrogen or $C_1$-$C_8$alkyl.

4. An azo dye according to claim 3, wherein K is a compound of the formula (2) in which $Y^1$ and $Y^2$ are =O or =NH, $R^2$ and $R^3$ are hydrogen or $C_1$-$C_4$alkyl and $Y^3$ is =O, =NH or =N—CN.

5. An azo dye according to claim 3, wherein K is a compound of the formula (3) in which Ar is a phenyl radical which is monosubstituted or disubstituted by methyl, methoxy or acetylamino.

6. An azo dye according to claim 1, in which $R^1$ is hydrogen, $C_1$-$C_4$alkyl or $C_1$-$C_4$alkoxy.

7. An azo dye according to claim 1, wherein X is O or N.

8. An azo dye according to claim 1, wherein Z is N.

9. An azo dye according to claim 1, wherein W is C or, if Z and X are N, is N.

10. An azo dye according to claim 1, wherein V is CH.

11. An azo dye according to claim 1, wherein the rings A and B constitute pyridineoxazole.

12. An azo dye according to claim 1, wherein the 1,4-phenylene radical D is not further substituted.

13. An azo dye according to claim 1, wherein R is a $C_1$-$C_4$alkyl group which is unsubstituted or is substituted by OH, $C_1$-$C_4$alkoxy, phenyl or $C_1$-$C_4$hydroxyalkoxy.

14. An azo dye according to claim 1, wherein K is a coupling component selected from the group consisting of compounds of the formula

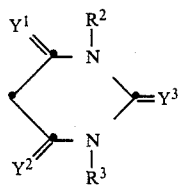 (2)

in which
Y$^1$ and Y$^2$ independently of one another are =O, =NH or =N—$C_1$-$C_6$alkyl, Y$^3$ is =O, =S, =NR$^2$ or =N—CN and R$^2$ and R$^3$ independently of one another are hydrogen, unsubstituted $C_1$-$C_6$alkyl or $C_1$-$C_6$alkyl substituted by OH, $C_1$-$C_4$alkoxy or $C_1$-$C_4$hydroxyalkoxy or unsubstituted phenyl or phenyl substituted by $C_1$-$C_4$alkyl, $C_1$-$C_4$alkoxy, halogen or nitro, or a compound of the formula

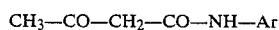 (3)

in which
Ar is a phenyl, naphthyl or benzthiazol-2-yl radical each of which is unsubstituted or substituted by $C_1$-$C_4$alkyl, $C_1$-$C_4$alkoxy, chlorine, bromine, nitro or acetylamino, or a compound of the formula

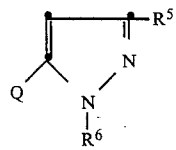 (4)

in which
Q is OH or NH$_2$, Q$_1$ is O or NH, R$^6$ is H, $C_1$-$C_4$alkyl, alkenyl, cycloalkyl, phenyl, benzyl or phenylethyl, and R$^5$ is identical to R$^6$ or is COOR$^6$ or CONHR$^6$, or a compound of the formula

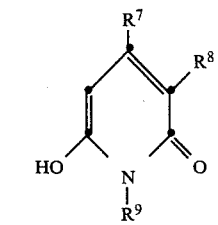 (5)

in which
R$^7$ is hydrogen or $C_1$-$C_4$alkyl, R$^8$ is CN, CONH$_2$ or SO$_2$NH$_2$ and R$^9$ is hydrogen or $C_1$-$C_8$alkyl, R$_1$ is hydrogen, $C_1$-$C_4$alkoxy, $C_1$-$C_6$alkyl or —NH—C$_2$-$C_6$alkanoyl or —NH—benzoyl, each of which is unsubstituted or substituted by 1 to 3 $C_1$-$C_4$alkyl, chlorine or methoxy groups, R is $C_1$-$C_4$alkyl which is unsubstituted or substituted by OH, $C_1$-$C_4$alkoxy or $C_1$-$C_4$hydroxyalkyl, and V is CH.

15. An azo dye according to claim 1, of the formula

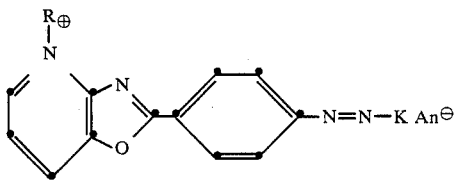 (6)

in which
R is $C_1$-$C_4$alkyl which is unsubstituted or substituted by OH, $C_1$-$C_4$alkoxy or $C_1$-$C_4$hydroxyalkoxy, K is a coupling component of the formula

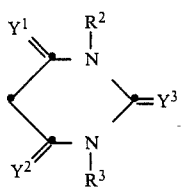 (2)

in which
R$^2$ and R$^3$ are hydrogen or $C_1$-$C_4$alkyl, Y$^1$ and Y$^2$ are =O or =NH and Y$^3$ is =O, =NH or =N—CN, or a coupling component of the formula

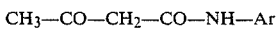 (3)

in which
Ar is a phenyl radical which is monosubstituted or disubstituted by methyl, methoxy or acetylamino, and An$^\ominus$ is an anion.

* * * * *